(12) United States Patent
Gesbert et al.

(10) Patent No.: US 6,377,819 B1
(45) Date of Patent: Apr. 23, 2002

(54) WIRELESS COMMUNICATION SYSTEM USING JOINED TRANSMIT AND RECEIVE PROCESSING

(75) Inventors: David J. Gesbert; Peroor K. Sebastian, both of Mountain View; Arogyaswami J. Paulraj, Stanford, all of CA (US)

(73) Assignee: Iospan Wireless, Inc., San Jose, CA (US)

( * ) Notice: Subject to any disclaimer, the term of this patent is extended or adjusted under 35 U.S.C. 154(b) by 0 days.

(21) Appl. No.: 09/544,621

(22) Filed: Apr. 6, 2000

(51) Int. Cl.$^7$ .............................. H04Q 7/20; H04B 1/38

(52) U.S. Cl. .................. 455/562; 455/101; 455/115; 455/517; 370/277; 370/342; 370/343; 370/347; 370/442

(58) Field of Search ................... 455/562, 561, 455/101, 115, 517, 422, 522; 370/334, 277, 342, 347, 442, 343

(56) References Cited

U.S. PATENT DOCUMENTS

| | | | |
|---|---|---|---|
| 5,815,488 A | | 9/1998 | Williams et al. |
| 5,933,421 A | | 8/1999 | Alamouti et al. |
| 5,999,800 A | * | 12/1999 | Choi et al. ................. 455/562 |
| 6,064,662 A | | 5/2000 | Gitlin et al. |
| 6,144,711 A | * | 11/2000 | Raleigh et al. ............. 370/342 |
| 6,154,661 A | * | 11/2000 | Goldburg ................... 455/562 |
| 6,185,440 B1 | * | 2/2001 | Barratt et al. .............. 455/562 |

FOREIGN PATENT DOCUMENTS

| | | | |
|---|---|---|---|
| EP | WO-009809381 A1 | * 3/1998 | ........... H04B/1/38 |
| WO | WO 98/09381 | 3/1998 | |

OTHER PUBLICATIONS

Paulraj, A., Taxonomy of space–time processing for wireless networks, IEE Proc—Radar Sonar Navig., vol. 145, No. 1, Feb. 1998.

* cited by examiner

Primary Examiner—William Trost
Assistant Examiner—Simon Nguyen
(74) Attorney, Agent, or Firm—Lumen Intellectual Property Services

(57) ABSTRACT

A wireless communication system comprises a base transceiver station and R remote transceivers $T_1 \ldots T_R$, each of the remote transceivers having multiple antennas. The base transceiver station has N base station antennas, each of the remote transceivers has M remote antennas, and $N \geq R$. The base transceiver station simultaneously transmits information signals $s_1 \ldots s_R$ to remote transceivers $T_1 \ldots T_R$, respectively. The base transceiver station comprises processing means for selecting R discrimination vectors $V_1 \ldots V_R$, each of the discrimination vectors having N components. The base transceiver station computes an N-component transmission signal vector U as follows:

$$U = \sum_{i=1}^{R} V_i s_i.$$

The transmission signal vector U is transmitted from the base transceiver station, preferably one component of U per base station antenna. The $i^{th}$ remote transceiver $T_i$ receives an M-component signal vector $Z_i$ through its M remote antennas, one component of $Z_i$ per antenna. The $i^{th}$ remote transceiver computes a reconstructed signal $y_i$ from the received signal vector $Z_i$. The discrimination vectors $V_1 \ldots V_R$ are preferably selected to optimize an efficiency of transmission, and the computation of $y_i$ preferably optimizes an efficiency of reception. Some embodiments of the present system and method employ time filtering, and some embodiments use frequency filtering.

59 Claims, 7 Drawing Sheets

(PRIOR ART)

WIRELESS COMMUNICATION SYSTEM USING JOINED TRANSMIT AND RECEIVE PROCESSING

FIELD OF THE INVENTION

This invention relates generally to wireless communication systems, and more particularly to wireless communication systems using a base transceiver station and remote transceivers, wherein both the base transceiver station and the remote transceivers have multiple antennas and signal processing capabilities.

BACKGROUND

Wireless communication is becoming an increasingly common form of communication, and the demand for wireless service continues to grow. The sources of demand include cellular mobile communication networks, wireless local area computer networks, wireless telephone networks, wireless cable TV, multi-user paging systems, high frequency modems, and more. Current implementations of these communication systems are all confined to limited frequency bands of operation either by practical considerations or by government regulation. As the capacity of these systems has been reached, demand for more service is met by allocating more frequency spectrum to the particular application and by utilizing the allocated spectrum more efficiently. In light of the basic physical principle that transmission of information requires bandwidth, the fundamental limitations of a finite amount of practically usable spectrum present a substantial barrier to meeting an exponentially increasing demand for wireless information transmission.

Conventional wireless communication systems attempt to solve the problem of high demand by using different multiple access schemes, the most common being frequency-division multiple access (FDMA), time-division multiple access (TDMA), and code-division multiple access (CDMA). All current systems employ FDMA, wherein the available frequency bandwidth is sliced into multiple frequency channels and signals are transmitted over the different channels simultaneously.

Current wireless systems also use TDMA, wherein multiple users share a common frequency channel by doing so at different times. Typically, analog data such as voice is digitized, compressed, then sent in bursts over an assigned frequency channel in assigned time slots. By interleaving multiple users in the available time slots, the number of simultaneous users of the system is increased.

CDMA allows multiple users to share a common frequency channel by using coded modulation schemes. The technology involves preprocessing the signal to be transmitted by digitizing it, modulating a wideband coded pulse train, and transmitting the modulated coded signal in the assigned channel. Multiple users are given distinct codes which decoders in the receivers are programmed to detect.

Another scheme for increasing the capacity of a wireless communication system is spatial division multiple access (SDMA), as discussed by Roy, III et al. in U.S. Pat. No. 5,642,353. SDMA exploits the spatial separation of a number of users to serve the users within the same conventional channel (that is, within the same time slot in the case of TDMA, frequency slot in the case of FDMA, and code in the case of CDMA). In this case, efficient exploitation of the spatial dimension to increase capacity requires the ability to separate a number of users simultaneously communicating on the same channel at the same time in the same local area (or cell).

The above mentioned separation of user up-link and down-link signals can be based on the direction of arrival (DOA) of the individual signals, as described in U.S. Pat. No. 5,828,658 by Ottersten et al. The DOA should be estimated accurately enough to enable the separation. If the users are close to each other, or if the signals are scattered many times, the DOA estimates are inaccurate. In these cases the SDMA technique fails because the separation of the signals is impossible.

As described in U.S. Pat. No. 5,592,490 by Barratt et al., the SDMA separation of signals can also be based on the transmit and receive spatial signatures. The transmit spatial signature characterizes how the remote terminal receives signals from each of the antenna array elements at the base station. The receive spatial signature characterizes how the base station antenna array receives signals from a particular remote terminal. The base station uses these spatial signatures to form multiple beams simultaneously so that each beam maximizes signal reception for one remote terminal. Whereas the receive spatial signatures can be determined by the remote user upon reception, the transmit spatial signatures must be known prior to transmission. Feedback from the remote terminals is necessary to enable computation of the transmit spatial signatures.

Figure 1:
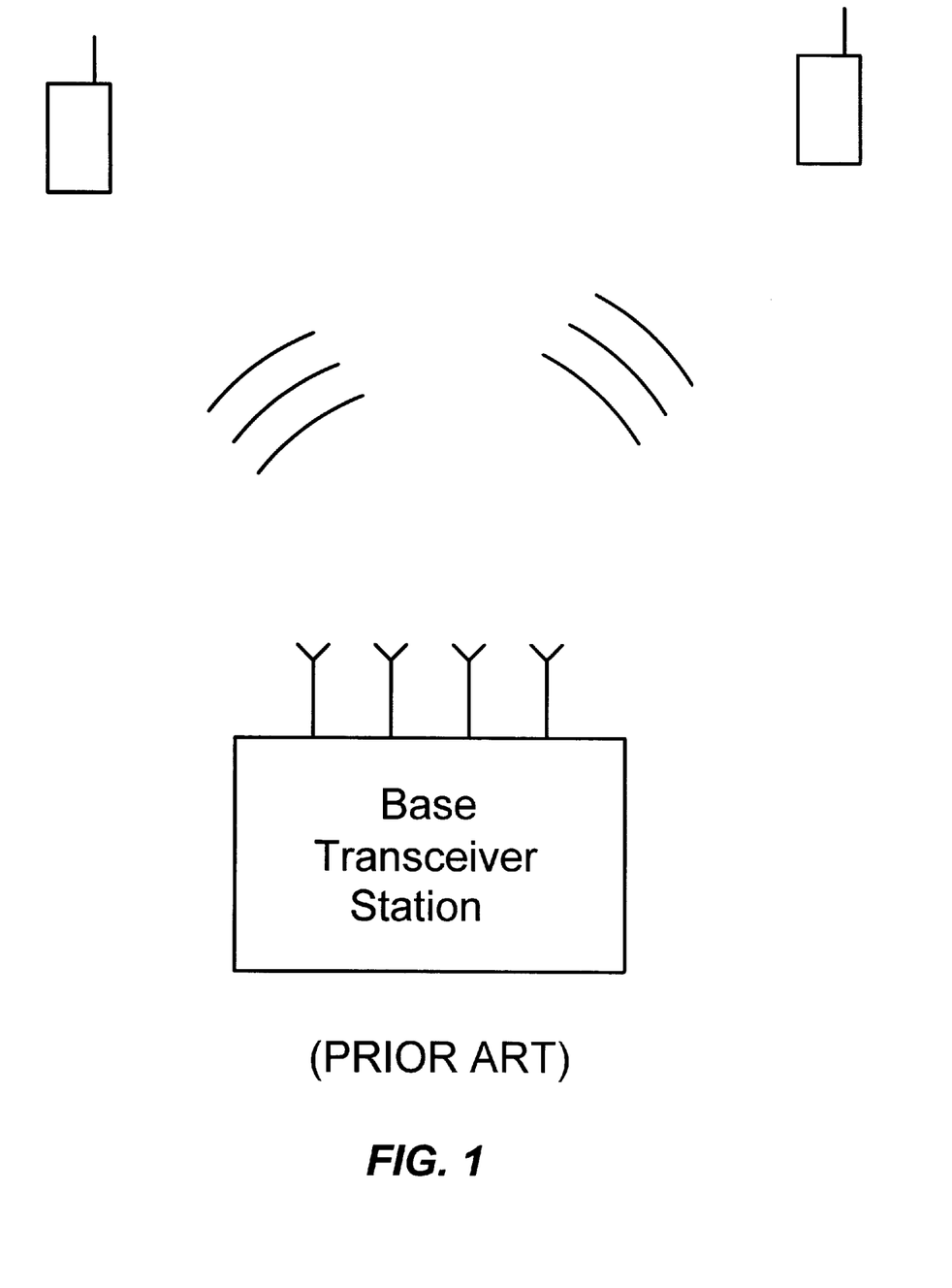
FIG. 1 shows a prior art wireless communication system employing spatial division multiple access.

FIG. 1 shows the operation of SDMA downlink, considering two remote terminals for example. During downlink, information is transmitted from a base transceiver station (BTS) to the remote terminals. (During uplink, information is transmitted from the remote users to the base transceiver station.) The BTS must have knowledge of the spatial signatures prior to transmission. An accurate estimate of the spatial signatures—or more generally, knowledge of the channels between the BTS and the remote terminals—is necessary to enable SDMA communication. As the accuracy of the channel estimate (or spatial signature estimate) deteriorates, SDMA communication becomes prone to error. In the extreme case when channel knowledge is absent, SDMA is impossible.

In present SDMA systems, the base station has multiple antennas, and each remote terminal has one antenna. Processing is carried out at the base station during both uplink and downlink operation. These SDMA systems require accurate channel knowledge, and this knowledge can only be gained by recording how signals sent from the base station are attenuated and phase-shifted by the time they are received remotely. This information, recorded at the remote units, must be sent back to the base station so that the channels may be computed by data processors. By the time this feedback and computation has occurred, the channel will have changed. (Wireless communication channels are constantly changing since the remote users, as well as the objects from which their signals are reflected, are in general moving.) Therefore, present wireless systems cannot reliably estimate the transmit spatial signatures accurately enough to make SDMA practical.

OBJECTS AND ADVANTAGES

It is therefore a primary object of the present invention to provide a system and method for wireless communication that allows multiple users to share the same time slot, frequency slot, and code, even in the absence of accurate transmit channel knowledge. It is a further object of the present invention to provide a wireless communication system wherein signal processing is distributed between the base transceiver station and the remote transceivers.

The present invention has the advantage of providing a system and method of multiple access that is reliable on both downlink and uplink, even when transmit channels are unknown or rapidly changing.

SUMMARY

A wireless communication system comprises a base transceiver station and remote transceivers having multiple antennas. Each of the remote transceivers comprises M remote antennas, wherein M is a number greater than 1. The base transceiver station comprises N base station antennas, wherein N is a number greater than 1. The base transceiver station services R remote transceivers $T_1 \ldots T_R$ on the same conventional channel, wherein $R \leq N$.

Information signals $s_1 \ldots s_R$ are simultaneously transmitted from the base transceiver station to remote transceivers $T_1 \ldots T_R$, respectively. The base transceiver station comprises processing means for selecting R discrimination vectors $V_1 \ldots V_R$, each of the discrimination vectors having N components. The base transceiver station computes an N-component transmission signal vector U as follows:

$$U = \sum_{i=1}^{R} V_i s_i.$$

The transmission signal vector U is transmitted from the base transceiver station, preferably one component of U per base station antenna.

The $i^{th}$ remote transceiver $T_i$ receives an M-component signal vector $Z_i$ through its M remote antennas, one component of $Z_i$ per antenna. The $i_{th}$ remote transceiver computes a reconstructed signal $y_i$ from the received signal vector $Z_i$.

In a preferred embodiment, the discrimination vectors $V_1 \ldots V_R$ are selected to be linearly independent, preferably orthogonal. In another preferred embodiment, the vectors $V_1 \ldots V_R$ are selected to optimize an efficiency of transmission of information signals $s_1 \ldots s_R$ to remote transceivers $T_1 \ldots T_R$, respectively. The efficiency is measured, for example, by the strength of the $i^{th}$ information signal si at transceiver $T_i$, or by the interference due to $s_i$ at remote transceivers other than $T_i$.

Remote transceiver $T_i$ computes reconstructed signal $y_i$ using either a linear or a nonlinear relationship between $y_i$ and $Z_i$. When a linear relationship is used, remote transceiver $T_i$ selects an M-component signature vector $W_i$, and computes $y_i$ according to $y_i = W_i^* \cdot Z_i$. Vector $W_i$ is preferably selected to maximize a signal quality parameter $\rho_i$ that measures the quality of reconstructed signal $y_i$. Signal quality parameter $\rho_i$ is typically defined using an M×N channel matrix $H_i$ that models a channel between the base transceiver station and remote transceiver $T_i$. In some embodiments, signal quality parameter $\rho_i$ is a signal to interference ratio, equal to $$|W_i^* H_i V_i|^2 / \sum_{j \neq i} |W_i^* H_i V_j|^2.$$

During uplink, transceiver $T_i$ transmits a remote information signal $s_i'$ by selecting an M-component remote processing vector $W_i'$ and transmitting the product $W_i' s_i'$, one component per antenna. The vector $W_i$ is preferably selected to optimize a remote transmission quality parameter.

The base transceiver station receives an N-component base station received signal vector X during uplink. The N components of vector X correspond to the N base station antennas. The base transceiver station selects N-component signature vectors $V_1' \ldots V_R'$, and computes base station reconstructed signals $u_1 \ldots u_R$ corresponding to signals sent from transceivers $T_1 \ldots T_R$, respectively, according to the formula: $u_i = V_i'^* \cdot X$. The signature vectors $V_1' \ldots V_R'$ are preferably selected to optimize base station reception quality parameters.

Some embodiments of the present system and method employ time filtering, and some embodiments use frequency filtering. In these embodiments, the transmission signal vector U is computed using p-component information vectors $S_1 \ldots S_R$ and N×p discrimination matrices $V_1 \ldots V_R$ as follows:

$$U = \sum_{i=1}^{R} V_i S_i.$$

Upon receiving signal vector $Z_i$, remote transceiver $T_i$ uses signal vector $Z_i$ to compute a reconstructed signal vector $Y_i$. In case of time filtering, the reconstructed signal vector $Y_i$ has only one component and it is computed from p' consecutive signal vectors $Z_i$. p' is a function of time of flight (ToF) difference between multipaths. In case of frequency filtering (for example when Orthogonal frequency Division Multiplexing [OFDM] is used), the reconstructed signal vector $Y_i$ has p components computed from each signal vector $Z_i$.

The wireless system of the present invention operates consistently better than prior art SDMA systems, even when the base transceiver station or remote transceiver lacks accurate transmit channel data. The improvement occurs because (1) the multiple antennas of the remote transceivers are used advantageously, and (2) the remote transceivers possess signal processing capabilities, so the remote transceivers do not need to wait for the base transceiver station to perform all of the processing.

DETAILED DESCRIPTION

Figure 2:
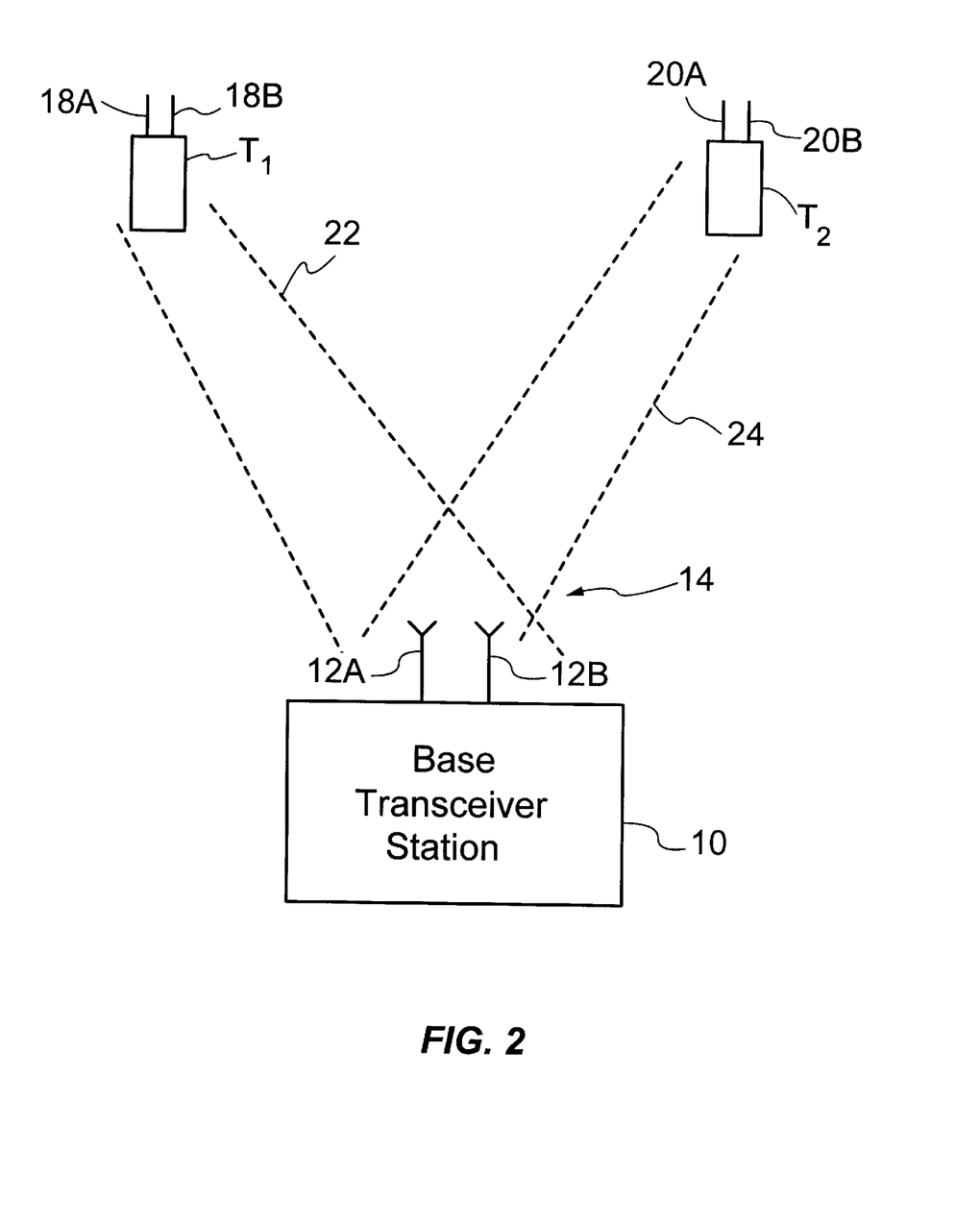
FIG. 2 shows an example of a wireless communication system according to the present invention.

FIG. 2 illustrates a wireless communication system according to the present invention. The wireless communication system comprises a base transceiver station (BTS) 10 and remote transceivers $T_1$ and $T_2$. Preferably, remote transceivers $T_1$ and $T_2$ share the same conventional channel. That is, both of the remote transceivers share the same frequency slot when FDMA is used; the remote transceivers share the same time slot when TDMA is used; and the remote transceivers share the same code when CDMA is used.

Remote transceiver $T_1$ comprises remote antennas 18A and 18B. Remote transceiver $T_2$ comprises remote antennas 20A and 20B. In general, the remote transceivers of the wireless communication system comprise M remote antennas, wherein M is a number greater than 1. In the example of FIG. 2, M=2.

Base transceiver station 10 comprises base station antennas 12A and 12B. The base station antennas compose an array 14 of base station antennas. In general, BTS 10 comprises N base station antennas, wherein N is a number greater than 1. In the example of FIG. 2, N=2.

BTS 10 is able to service a number R of independent remote transceivers $T_1 \ldots T_R$ that share the same conventional channel. In general, $R \leq N$. In the embodiment shown in FIG. 2, R=2.

Two meanings of the word "channel" are commonly used when discussing wireless systems, and both meanings are used here. The first definition, already alluded to, describes the frequency slot, time slot, and code in FDMA, TDMA, and CDMA systems, respectively. The word "channel" also describes the path between a transmitter and a receiver. In FIG. 2, signals travel in a channel 22 to reach remote transceiver $T_1$ from BTS 10. Similarly, signals propagate through a channel 24 when BTS 10 communicates with remote transceiver $T_2$. In general, channels can include line-of-sight paths as well as one or more reflected paths. Some channels contain only reflected paths.

Downlink—Base Transceiver Station

Figure 3:
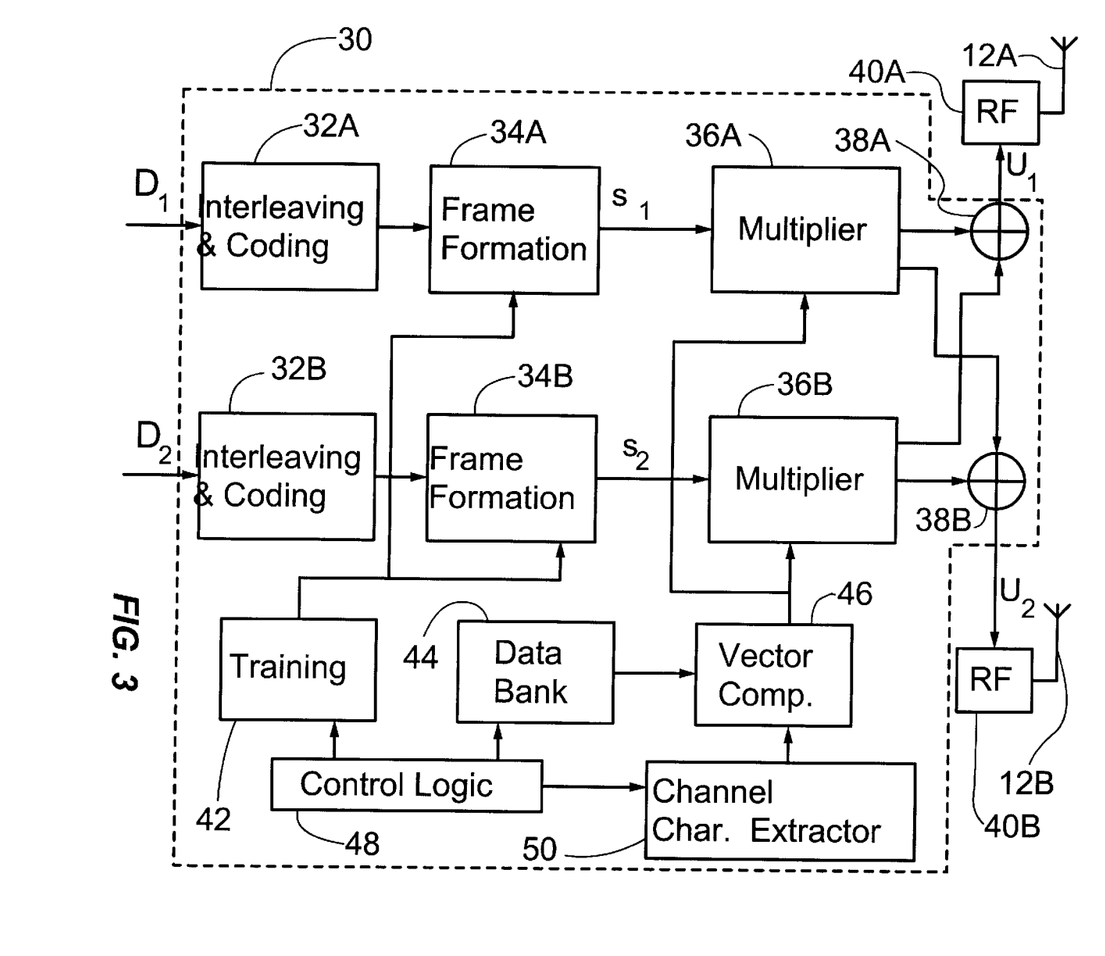
FIG. 3 shows a schematic of a base station transmission processor belonging to a base transceiver station according to a preferred embodiment of the present invention.

Base transceiver station 10 comprises a base station transmission processor 30, shown in FIG. 3. First and second data streams $D_1$ and $D_2$ contain information that is to be transmitted. The data streams are preferably bit streams. Base station transmission processor 30 prepares the data streams for transmission as follows.

First data stream $D_1$ is processed by an interleaving and coding unit 32A, which performs standard interleaving and error-correction coding operations on first data stream $D_1$. The first data stream is then processed by a frame formation unit 34A, which gives data stream $D_1$ a desired temporal structure according to well known principles. For example, when TDMA is used, frame formation unit 34A ensures that data stream $D_1$ occupies the desired time slot. Frame formation unit 34A also receives input from a training unit 42, which generates training sequences. Frame formation unit 34A incorporates the training sequences into data stream $D_1$.

Frame formation unit 34A maps the bits of data stream $D_1$ to symbols, using any known technique such as quadrature amplitude modulation (QAM). Frame formation unit 34A outputs an information signal $s_1$, wherein information signal $s_1$ is a symbol stream. Other methods for generating symbol streams are known in the art and may be used to generate information signal $s_1$.

A second data stream $D_2$ is similarly processed by an interleaving and coding unit 32B and a frame formation unit 34B, resulting in an information signal $s_2$. Information signal $s_2$ is also a symbol stream. Information signal $s_1$ enters a first multiplier 36A that multiplies information signal $s_1$ by a first discrimination vector $V_1$ to obtain $V_1 s_1$. In the example of FIG. 3, vector $V_1$ has two components $V_{11}$ and $V_{12}$, and each component is in general complex. Similarly, a second multiplier 36B multiplies information signal $s_2$ by a second discrimination vector $V_2$ to obtain $V_2 s_2$. In the example of FIG. 3, vector $V_2$ has two complex components $V_{21}$ and $V_{22}$. The values of discrimination vectors $V_1$ and $V_2$ are determined by a vector computation unit 46. The determination of the discrimination vectors is described in detail below.

First multiplier 36A outputs the first component of $V_1 s_1$, $V_{11} s_1$, to an adder 38A. Second multiplier 36B outputs the first component of $V_2 s_2$, $V_{21} s_2$, to adder 38A. Adder 38A generates a transmission signal $U_1$, wherein $U_1 = V_{11} s_1 + V_{21} s_2$. Similarly, an adder 38B produces a transmission signal $U_2 = V_{12} s_1 + V_{22} s_2$ from outputs from multipliers 36A and 36B. The combined result of adders 38A and 38B is a transmission signal vector $U = (U_1, U_2)$, wherein $$U = \sum_i V_i s_i.$$

Transmission signal $U_1$ is then sent to a radio frequency (RF) up-conversion unit 40A. Up-conversion unit 40A prepares $U_1$ to be transmitted from base station antenna 12A according to known principles. Preferably, up-conversion unit 40A comprises the following components: a pulse-shaping filter, a digital-to-analog-converter, an intermediate frequency modulator, a radio-frequency converter, and an amplifier. Transmission signal $U_1$ sequentially passes through the above components of up-conversion unit 40A prior to transmission.

Similarly, transmission signal $U_2$ is up-converted by an RF up-conversion unit 40B. Transmission signals $U_1$ and $U_2$ are transmitted from base station antennas 12A and 12B, respectively, after being up-converted.

Although a particular embodiment of the base station transmission processor is shown in FIG. 3, the invention is not limited to this embodiment. In general, R information signals $s_1 \ldots s_R$ are generated from R data streams $D_1 \ldots D_R$, respectively. Transmission signal vector U is then computed using the R information signals and R discrimination vectors $V_1 \ldots V_R$. In general, the discrimination vectors each have N components, and transmission signal vector U also has N components. The transmission signal vector is given by:

$$U = \sum_{i=1}^{R} V_i s_i. \tag{1}$$

The transmission signal vector is then transmitted from the N base station antennas. In the preferred embodiment, there is a one-to-one correspondence between the components of U and the base station antennas. For example, the first component of U is transmitted from the first base station antenna; the second component of U is transmitted from the second antenna, and so on. In alternative embodiments, each of the base station antennas transmits a linear combination of the components of U.

The discrimination vectors $V_1 \ldots V_R$ are preferably selected to enable remote transceiver $T_1$ to receive information signal $s_1$, remote transceiver $T_2$ to receive information signal $s_2$, and so on, with optimum efficiency. The discrimination vectors can be chosen in a variety of ways to achieve this goal.

In a first method of selecting $V_1 \ldots V_R$, the discrimination vectors are chosen to be linearly independent. In a preferred embodiment of this method, the discrimination vectors are orthogonal. Default values for an orthogonal set of discrimination vectors are preferably stored in a data bank 44, as shown in FIG. 3. Vector computation unit 46 uses the default values from data bank 44 and sends them to multipliers 36A and 36B. This first method of selecting $V_1 \ldots V_R$ is preferably used when there is little or no information at the base transceiver station about the channels between the base transceiver station and the remote transceivers $T_1 \ldots T_R$.

The channels between the base transceiver station and the remote transceivers $T_1 \ldots T_R$ are characterized by channel matrices $H_1 \ldots H_R$, respectively. Each channel matrix is an M×N matrix, corresponding to the N base station antennas of the base transceiver station and the M remote antennas of each remote transceiver. The (i,j) element of $H_k$ characterizes how a signal sent from the $j^{th}$ base station antenna is received by the $i^{th}$ remote antenna of remote transceiver $T_k$. In other words, when the N base station antennas transmit an N-component vector A (one component from each base station antenna), remote transceiver $T_k$ receives an M-component vector $B=H_k A$ (one component through each remote antenna). Here standard matrix multiplication is indicated by the product $H_k A$. In the embodiment of FIG. 2, $H_1$ describes channel 22, and $H_2$ describes channel 24.

In a second method of selecting $V_1 \ldots V_R$, the $i^{th}$ discrimination vector $V_i$ is selected to minimize a measure of interference $\mu_i$ due to the presence of $i^{th}$ information signal $s_i$ at remote transceivers other than $T_i$. In one embodiment, the measure of interference is calculated as:

$$\mu_i = \sum_{j \neq i} |H_j V_i|^2.$$

Thus, in this embodiment, vector computation unit 46 selects $V_i$ to minimize $\mu_i$, for i=1 ... R.

To enable the second method of selecting $V_1 \ldots V_R$, the channel matrices $H_1 \ldots H_R$ must be approximately known. These channel matrices are obtained by channel characteristics extractor 50, shown in FIG. 3. The channel characteristics extractor then delivers the channel matrices to vector computation unit 46.

In the case of time division duplexing (TDD), channel characteristics extractor 50 infers the channel matrices from transmissions from the remote transceivers. This is possible because when TDD is used, the base transceiver station transmits and receives over the same frequency channels.

When frequency division duplexing (FDD) is used, the base transceiver station transmits over different frequencies than those by which it receives. Channel matrices at one frequency cannot be used to reliably predict channel matrices at another frequency if the frequencies are spaced widely apart. Therefore in this case, the channel characteristics extractor preferably uses explicit feedback from the remote transceivers to determine the channel matrices. (In some embodiments where the transmit and receive frequencies are close together, channel characteristics extractor 50 infers the channel matrices from transmissions from the remote transceivers.)

In any case, channel characteristics extractor 50 models the channels to remote transceivers $T_1 \ldots T_R$ by channel matrices $H_1 \ldots H_R$, respectively. A control logic unit 48 determines whether (1) vector computation unit 46 uses the channel matrices to find optimum values for $V_1 \ldots V_R$, or (2) vector computation unit 46 uses the default values stored in data bank 44. Control logic unit 48 also controls training unit 42.

In a third method of selecting $V_1 \ldots V_R$, the $i^{th}$ discrimination vector $V_i$ is selected to maximize a signal quality $\tau_i$ of the $i^{th}$ information signal $s_i$. In one embodiment, signal quality $\tau_i$ is calculated as: $\tau_i = |H_i V_i|^2$. In this embodiment, $V_i$ maximizes $\tau_i$, for i=1 to R.

In the preferred embodiment, information signals $s_1 \ldots s_R$ share the same conventional channel. That is, the information signals, when broadcast as transmission signal vector U, share the same conventional multiple access slots. In alternative embodiments, the information signals occupy different conventional channels.

As shown in FIG. 3, base station transmission processor 30 comprises interleaving and coding units 32A and 32B, frame formation units 34A and 34B, multipliers 36A and 36B, and adders 38A and 38B. The base station transmission processor also comprises training unit 42, data bank 44, vector computation unit 46, control logic unit 48, and channel characteristics extractor 50.

The above discussion applies when there is little or no inter-symbol interference, or ISI. In many applications, however, the channels between the base transceiver station and the remote transceivers are multipath, with each of the multiple paths having its own characteristic time delay. This means that, for example, remote transceiver $T_1$ may simultaneously receive a first symbol sent from the base transceiver station at a time $t_1$, and a second symbol sent at a time $t_2$. The time of flight difference $t_2-t_1$ corresponds to the difference in path lengths between two paths belonging to the channel to remote transceiver $T_1$. Since the remote transceiver receives more than one symbol at one time, inter-symbol interference takes place.

To mitigate this problem, equalization techniques such as time filtering are well known in the art. For example when time filtering is used, linear combination of a number of symbols are transmitted at once to each remote transceiver. The number of simultaneous symbols transmitted to transceiver $T_1$, for example, is a function of the largest time of flight difference between the channel paths, or channel taps, composing the channel to transceiver $T_1$.

The present invention also allows for time filtering. When time filtering is used, information signals $s_1 \ldots s_R$ are replaced by information vectors $S_1 \ldots S_R$, wherein each of the information vectors comprises p components, and each component is a time delayed symbol. The number p is chosen to implement the time filtering described above. In this embodiment, discrimination vectors $V_1 \ldots V_R$ are replaced by N×p discrimination matrices $V_1 \ldots V_R$. (The matrices are distinguished from the vectors typographically by the absence of bold-face type.) Transmission signal vector U is then computed as:

$$U = \sum_{i=1}^{R} V_i S_i \qquad (1a)$$

As before, transmission signal vector U is an N-component vector.

In another embodiment, frequency filtering is used. In this embodiment, the base transceiver station broadcasts to each of the remote transceivers over multiple sub-carrier frequencies (like in case of OFDM) simultaneously. In this embodiment, information signals $s_1 \ldots s_R$ are again replaced by p-component information vectors $S_1 \ldots S_R$, but in this embodiment, p is the number of the sub-carrier frequencies used. The N×p discrimination matrices $V_1 \ldots V_R$ are used, and in this case are optimized for frequency filtering. Eq. (1a) is used to compute the N-component transmission signal vector U.

Downlink—Remote Transceiver

Figure 4:
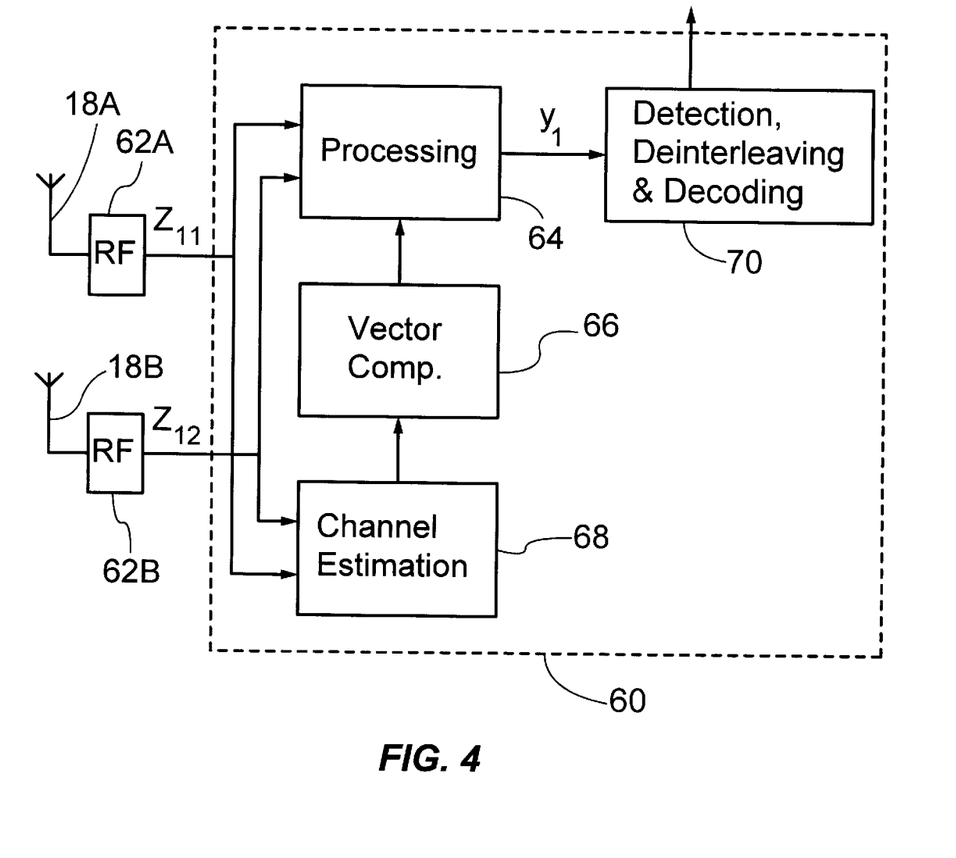
FIG. 4 shows a remote reception processor of a remote transceiver according to the preferred embodiment.

Remote transceiver $T_1$ comprises a remote reception processor 60, shown in FIG. 4. Remote antennas 18A and 18B receive signals from the base transceiver station. The signals from remote antennas 18A and 18B are down-converted by RF down-converters 62A and 62B, respectively, to obtain received signals $Z_{11}$ and $Z_{12}$, respectively. The received signals are referred to collectively as a received signal vector $Z_1$, wherein $Z_1=(Z_{11}, Z_{12})$ In general, remote transceiver $T_1$ has M remote antennas, and received signal vector $Z_1$ correspondingly has M components.

RF down-converter 62A operates according to known techniques and preferably comprises an RF amplifier, a mixer, a demodulator, and an analog-to-digital converter. Received signal $Z_{11}$ is generally a stream of complex numbers. Similarly, RF down-converter 62B uses amplification, frequency mixing, demodulation, and A/D techniques to produce received signal $Z_{12}$. Received signal $Z_{12}$ is also a stream of complex numbers, in general. Received signal vector $Z_1$ is converted into a received data stream by remote reception processor 60 as follows.

The components of vector $Z_1$ are input into a signal processor 64 that generates a reconstructed signal $y_1$ from the vector $Z_1$. The reconstructed signal $y_1$ approximates information signal $s_1$.

In some embodiments, reconstructed signal $y_1$ is obtained from received signal vector $Z_1$ using an M-component signature vector $W_1$. Reconstructed signal $y_1$ is given by the formula:

$$y_1 = W_1^* \cdot Z_1. \quad (2)$$

That is, $y_1$ depends linearly upon $Z_1$. In Eq. (2) and below, the asterisk stands for complex conjugation and transposition. The multiplication implied by Eq. (2) is the standard vector dot product.

The value of signature vector $W_1$ is determined by a remote vector computation unit 66, which outputs vector $W_1$ to signal processor 64. The output of signal processor 64 is reconstructed signal $y_1$.

A detection, deinterleaving and decoding unit 70 processes reconstructed signal $y_1$ according to standard principles to produce the received data stream. In particular, detection, deinterleaving and decoding unit 70 detects symbols in reconstructed signal $y_1$, converts the symbols to bits, then deinterleaves and decodes the bits to produce the received data stream. The received data stream is a bit stream.

Signature vector $W_1$ is preferably selected to maximize a received signal quality parameter $\rho_1$. The parameter $\rho_1$ quantifies the accuracy with which reconstructed signal $y_1$ duplicates information signal $s_1$. In one embodiment, the received signal quality parameter $\rho_i$ is equal to a signal to interference ratio:

$$\rho_1 = |W_1^* H_1 V_1|^2 \Big/ \sum_{i \neq 1} |W_1^* H_1 V_i|^2. \quad (3)$$

The numerator in Eq. (3) is proportional to the signal strength at remote transceiver $T_1$; the denominator is proportional to the interference at $T_1$ due to signals $s_2 \ldots s_R$. Standard vector and matrix multiplication is implied, so that, for example, $W_1^* H_1 V_1$ is a scalar quantity.

To implement the method using Eq. (3) above, the quantities $H_1 V_i$ must be substantially accurately known, for i=1 to R. These quantities are determined by a channel estimation unit 68 during training sequences sent by the base transceiver station. The estimates of $H_1 V_i$ are then sent from channel estimation unit 68 to remote vector computation unit 66. The remote vector computation unit then finds the value of $W_1$ that maximizes received signal quality parameter $\rho_1$. The remote vector computation unit delivers the resultant $W_1$ to signal processor 64.

The quantities $H_1 V_i$ characterize the transmit channel from the base transceiver station to remote transceiver $T_1$. The quantities $H_1 V_i$ are easily determined by the present system and method, since these quantities are determined by remote transceiver $T_1$ after receiving a transmission from the base transceiver station. This situation contrasts with conventional SDMA systems, where transmit channel information must be known at the base transceiver station prior to transmission.

In some embodiments, signature vector $W_1$ is not used to determine reconstructed signal $y_1$. In these embodiments, reconstructed signal $y_1$ depends nonlinearly upon received signal vector $Z_1$. In one example of such an embodiment, an estimate of $H_1 V_1$ is delivered to signal processor 64 from channel estimation unit 68. Signal processor 64 then calculates $|Z_1 - H_1 V_1 t_i|^2$ for different known symbols $t_i$. The value of $t_i$ that minimizes the quantity $|Z_1 - H_1 V_1 t_i|^2$ is then output as a symbol. In this example, detection, deinterleaving and decoding unit 70 does not need to detect symbols in reconstructed signal $y_1$, since the symbols were already determined during the production of reconstructed signal $y_1$.

As shown in FIG. 4, remote reception processor 60 comprises signal processor 64, remote vector computation unit 66, channel estimation unit 68, and deinterleaving and decoding unit 70. In general, the R remote transceivers operate simultaneously according to the principles described above for $T_1$. Remote transceiver $T_i$ receives a received signal vector $Z_i$ and computes a reconstructed signal $y_i$ from the vector $Z_i$.

In some embodiments, the remote transceivers are adapted for time filtering; in some embodiments, the remote transceivers are adapted for frequency filtering. In such embodiments, remote transceiver $T_1$, for example, computes a reconstructed signal vector $Y_1$ instead of reconstructed signal $y_1$. In case of time filtering, the reconstructed signal vector $Y_i$ has only one component and it is computed from p' consecutive signal vectors $Z_i$. p' is a function of time of flight (ToF) difference between multipaths. In case of frequency filtering (for example when Orthogonal frequency Division Multiplexing [OFDM] is used), the reconstructed signal vector $Y_i$ has p components computed from each signal vector $Z_i$. As an example, when linear methods are used, reconstructed signal vector $Y_1$ depends linearly upon p' consecutive received signal vectors $Z_{11} \ldots Z_{1p'}$, p' signature vectors $W_{11} \ldots W_{1p'}$ are used in place of signature vector $W_1$, and reconstructed signal vector $Y_1$ is computed as:

$$Y_1 = \sum_{i=1}^{p'} W_{1i}^* Z_{1i} \quad (2a)$$

Uplink—Remote Transceiver

Figure 5:
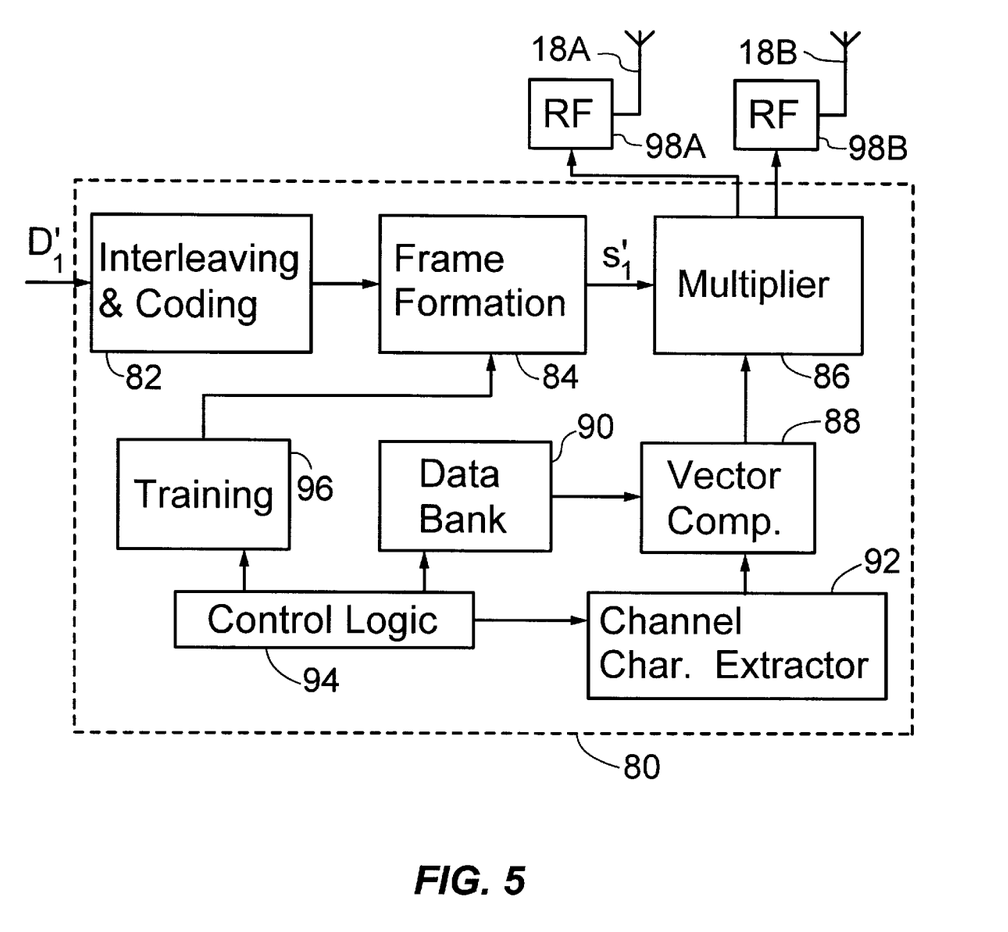
FIG. 5 shows a remote transmission processor belonging to the remote transceiver.

During uplink, one or more of the remote transceivers sends a message to the base transceiver station. As shown in FIG. 5, remote transceiver $T_1$ comprises a remote transmission processor 80 for uplink. Remote transmission processor 80 is analogous to base station transmission processor 30 of FIG. 3. A remote data stream $D_1'$ is prepared for transmission by remote transmission processor 80.

Remote data stream $D_1'$ is a bit stream, and is processed by a remote interleaving and coding unit 82 and a frame formation unit 84 to produce a remote information signal $s_1'$.

Remote information signal $s_1'$ is a symbol stream. A remote multiplier 86 multiplies the remote information signal by an M-component remote processing vector $W_1'$ to obtain a remote transmission signal vector $U_1'$, wherein $U_1' = W_1' s_1'$.

The M components of the vector $U_1'$ are transmitted from the M antennas of transceiver $T_1$, one component per antenna. In the embodiment of FIG. 5, M=2. Remote RF uplink units 98A and 98B convert the first and second components, respectively, of remote transmission signal vector $U_1'$ to RF signals that are transmitted from remote antennas 18A and 18B, respectively.

In the preferred embodiment, remote processing vector $W_1'$ is selected to maximize a remote transmission quality parameter $r_1$. The parameter $r_1$ is a measure of the quality of transmission from remote transceiver $T_1$ to the base transceiver station.

In the preferred embodiment, the channel from remote transceiver $T_1$ to the base station antennas is characterized by an N×M return channel matrix $H_1'$. Return channel matrix $H_1'$ is analogous to channel matrix $H_1$: $H_1'$ describes transmissions from remote transceiver $T_1$ to the base transceiver station; $H_1$ characterizes transmission from the base transceiver station to remote transceiver $T_1$. When both transmissions occur at the same frequency, as occurs in TDD, $H_1'$ can be computed from $H_1$ and vice versa, since the uplink and downlink channels are reciprocal. When uplink and downlink transmissions occur at different frequencies, the matrices $H_1$ and $H_1'$ have to be computed independently.

In one embodiment, the remote transmission quality parameter $r_1$ is calculated as follows. A set of N orthonormal vectors $\{e_1 \ldots e_N\}$ is selected, wherein each of the vectors $e_1 \ldots e_N$ has N components. The parameter $r_1$ is given by:

$$r_1 = |e_1^* H_1' W_1'|^2 / \sum_{i \neq 1} |e_i^* H_1' W_1'|^2 \qquad (4)$$

For example, when N=3, a preferred orthonormal basis is:

$$e_1 = \begin{pmatrix} 1 \\ 0 \\ 0 \end{pmatrix}, e_2 = \begin{pmatrix} 0 \\ 1 \\ 0 \end{pmatrix}, e_3 = \begin{pmatrix} 0 \\ 0 \\ 1 \end{pmatrix}.$$

In this case, the numerator of Eq. (4) is proportional to the signal strength due to remote transceiver $T_1$ at the first base station antenna. The denominator of Eq. (4) is proportional to the sum of the intensities of the signals from $T_1$ that are received at the second and third base station antennas. In this case, remote processing vector $W_1'$ is selected to concentrate transmissions from the first remote transceiver onto the first base station antenna. Clearly, other schemes can be used, corresponding to different choices for the orthonormal basis $\{e_1 \ldots e_N\}$.

Referring again to FIG. 5, a remote uplink vector computation unit 88 computes remote processing vector $W_1'$ either using default values from data bank 90 or by optimizing remote transmission quality parameter $r_1$. When the parameter $r_1$ is optimized, remote uplink vector computation unit 88 obtains channel matrix $H_1'$ from a remote channel characteristics extractor 92. As in the case of the base transceiver's channel characteristics extractor, the remote channel characteristics extractor computes $H_1'$ either using feedback from the base station, or, in the TDD case, using characteristics of the downlink signal. A remote control logic unit 94 governs data bank 90 and remote channel characteristics extractor 92, as well as a remote training unit 96 that sends training information to remote frame formation unit 84.

The uplink process described above applies to all of the remote transceivers. Remote transceiver $T_i$ generates an M-component remote transmission signal vector $U_i'$ using an $i^{th}$ remote information signal $s_i'$ and an $i^{th}$ remote processing vector $W_i'$, wherein $U_i'=W_i's_i'$. Preferably, remote processing vector $W_i'$ optimizes an $i^{th}$ remote transmission quality parameter $r_i$. As an example, $$r_1 = |e_i^* H_i' W_i'|^2 / \sum_{j \neq 1} |e_j^* H_i' W_i'|^2.$$

As shown in FIG. 5, remote transmission processor 80 comprises remote interleaving and coding unit 82, frame formation unit 84, remote multiplier 86, remote uplink vector computation unit 88, data bank 90, remote channel characteristics extractor 92, remote control logic unit 94, and remote training unit 96.

As discussed before, some embodiments implement time filtering, and some embodiments use frequency filtering. In these embodiments, remote information signal $s_1'$, for example, is replaced by a p-component remote information vector $S_1'$, and remote processing vector $W_1'$ is replaced by an M×p remote processing matrix $W_1'$. The M-component remote transmission signal vector $U_1'$ is then computed as: $U_1'=W_1'S_1'$.

Uplink—Base Transceiver Station

Figure 6:
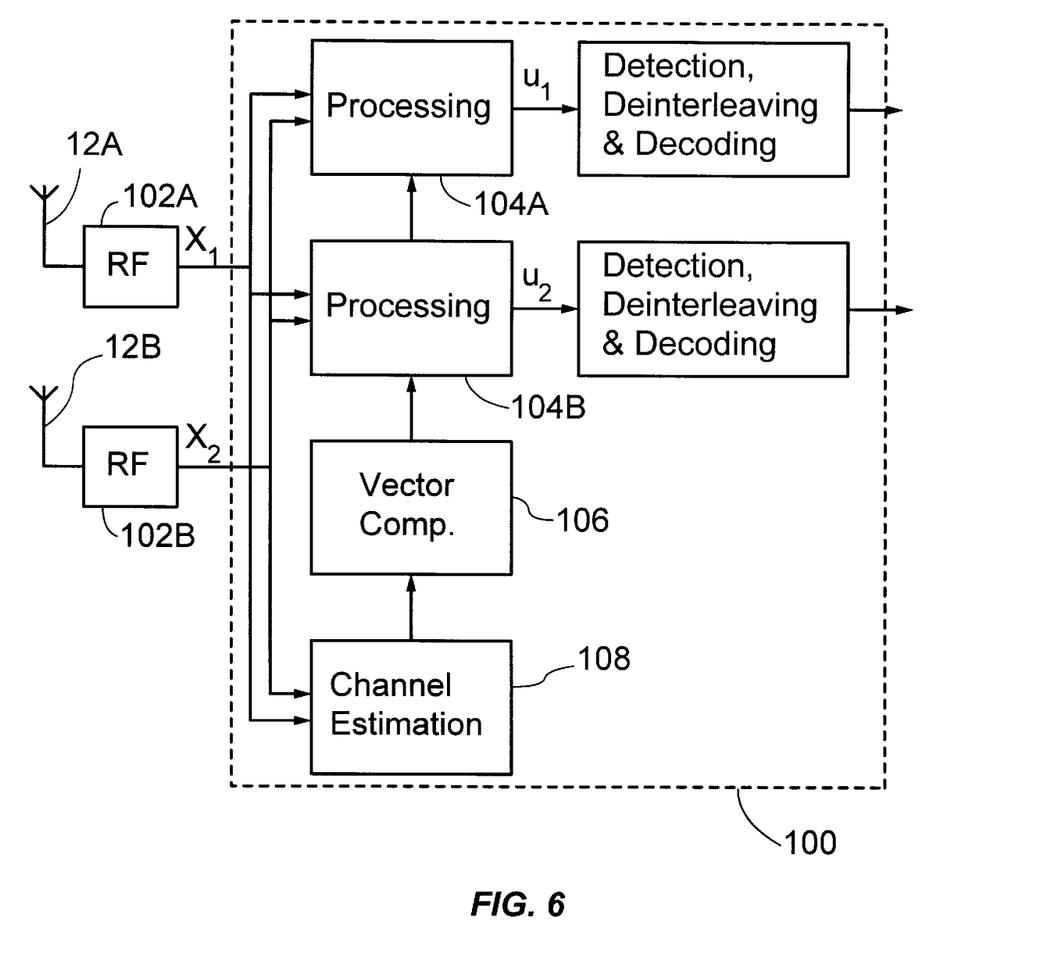
FIG. 6 shows a reception processor of the base transceiver station.

The base transceiver station receives signals from the remote transceivers during uplink. Referring to FIG. 6, base station antennas 12A and 12B receive signals from the remote transceivers. The signals from base station antennas 12A and 12B are down-converted by RF down-converters 102A and 102B, respectively, to obtain base station received signals $X_1$ and $X_2$, respectively. The received signals are referred to collectively as a base station received signal vector X, wherein $X=(X_1, X_2)$.

RF down-converters 102A and 102B each preferably comprises an RF amplifier, a frequency mixer, a demodulator, and an analog-to-digital converter. The received signal vector X is produced by the RF down-converters, and the components of received signal vector X are streams of complex numbers. In general, the base transceiver station has an array of N base station antennas, and base station received signal vector X accordingly has N components.

The base transceiver station comprises a reception processor 100, shown in FIG. 6. Reception processor 100 processes the components of vector X to generate base station reconstructed signals $u_1 \ldots u_R$. The base station reconstructed signals $u_1 \ldots u_R$ are approximations to remote information signals $s'_1 \ldots s'_R$, respectively.

In some embodiments, signals $u_1 \ldots u_R$ are obtained from vector X using N-component base station signature vectors $V_1' \ldots V_R'$. In these embodiments, the $i^{th}$ base station reconstructed signal $u_i$ is given by:

$$u_i = V_i'^* \cdot X \qquad (5)$$

Reception processor 100 comprises R processing units for performing the operation of Eq. (5), for i=1 to R. In the embodiment of FIG. 6, R=2, and reception processor 100 comprises processing units 104A and 104B, whose outputs are $u_1$ and $u_2$, respectively.

The base station signature vectors $V_1' \ldots V_R'$ are determined by a computation unit 106. The vectors $V_1' \ldots V_R'$ are preferably selected to maximize base station reception quality parameters $\beta_1 \ldots \beta_R$. The parameters $\beta_1 \ldots \beta_R$ measure the quality of reception from remote transceivers $T_1 \ldots T_R$, respectively.

As an example, the base station reception quality parameters in some embodiments are given by:

$$\beta_i = |V_i'^* H_i' W_i'|^2 \Big/ \sum_{j \neq i} |V_i'^* H_j' W_j'|^2. \quad (6)$$

Eq. (6) gives a signal to interference ratio for base station reconstructed signal $u_i$. The return channel matrices $H_1'$ . . . $H_R'$ are estimated by a base station channel estimator 108, shown in FIG. 6. Reception processor 100 comprises processing units 104A and 104B, computation unit 106, and base station channel estimator 108.

In some embodiments, base station reconstructed signals $u_1$ . . . $u_R$ depend nonlinearly upon received signal vector X. For example, signal us may be reconstructed using a nonlinear technique analogous to the nonlinear technique described above for producing signal $y_1$ during downlink.

As already mentioned, some embodiments use time filtering, and some use frequency filtering. In case of frequency filtering such as in OFDM, p-component base station reconstructed signal vectors $U_1$ . . . $U_R$ are computed instead of reconstructed signals $u_1$ . . . $u_R$. As an example, when linear methods are used, the base station reconstructed signal vector $U_1$ . . . $U_R$ depend linearly upon received signal vector X, p×N base station signature matrices $V_1'$ . . . $V_R'$ are used to compute the reconstructed signal vectors according to: $U_i = V_i' X$.

System Performance

Figure 7:
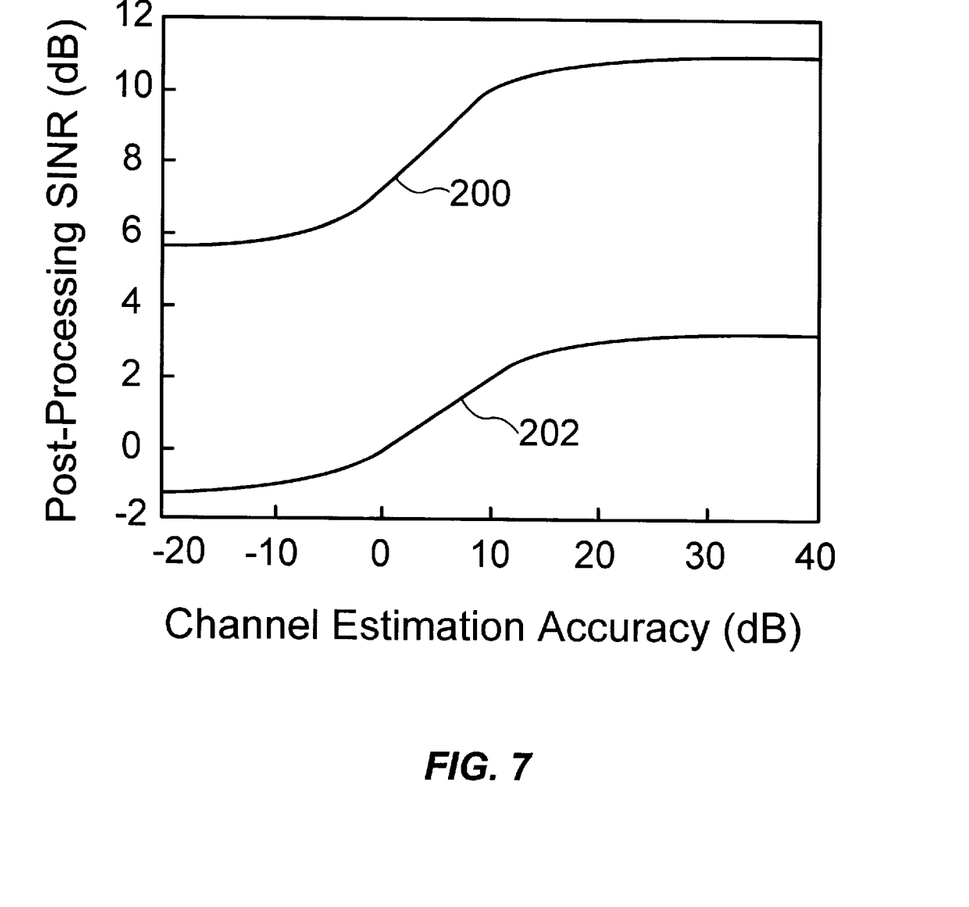
FIG. 7 is a graph of performances of the present invention and of the prior art.

FIG. 7 shows a graph of a performance curve 200 of the system of the present invention, and a performance curve 202 of a conventional SDMA system. The curves of FIG. 7 were generated in a simulation where remote transceiver $T_1$ receives signals having a 10 dB signal-to-noise ratio before processing. The x-axis of FIG. 7 gives the channel estimation accuracy, which expresses, in dB, the ratio of the matrix elements of $H_1$ to the uncertainty in those elements. At 0 dB, the ratio is 1:1, and the channel is 50% uncertain.

The y-axis of FIG. 7 gives the signal to interference-plus-noise (SINR) ratio for the reconstructed signal $y_1$. Curve 200 is always above curve 202. Therefore the wireless system of the present invention performs better than conventional SDMA systems at all levels of channel estimation accuracy.

Although the description above contains many specificities, these should not be construed as limiting the scope of the invention but as merely providing illustrations of some of the presently preferred embodiments. For example, the exact designs of the transmission and reception processors 30, 60, 80, and 100, of FIGS. 3, 4, 5, and 6, respectively, are not crucial to the invention. As is known in the art, the methods outlined above can be implemented using a variety of hardware and software systems.

The above method and system can clearly be used when the number of remote transceivers sharing the same conventional channel, R, is less than or equal to the number of remote antennas, M, belonging to each remote transceiver. However, the present method and system can also be used when R>M by supplementing the present method with conventional SDMA techniques. Therefore the scope of the invention should not be limited to the embodiments described above, but should be determined by the following claims and their legal equivalents.

We claim:

1. In a wireless communication system comprising a base transceiver station, said base transceiver station comprising an array of N base station antennas; a method for simultaneously sending R information signals $s_1$ . . . $s_R$ from said base transceiver station to R remote transceivers $T_1$ . . . $T_R$, respectively, wherein each of said remote transceivers comprises M remote antennas; said method comprising the following steps:
   (a) selecting R discrimination vectors $V_1$ . . . $V_R$, each of said discrimination vectors having N components;
   (b) computing an N-component transmission signal vector U, wherein $$U = \sum_{i=1}^{R} V_i s_i;$$

(c) transmitting the N components of said transmission signal vector U from said array of base station antennas;
   (d) receiving, through the M remote antennas of a first of said remote transceivers, an M-component received signal vector $Z_1$; and
   (e) computing a reconstructed signal $y_1$ from said received signal vector $Z_1$;
   wherein N≧R and M>1.

2. The method of claim 1, wherein said discrimination vectors are linearly independent.

3. The method of claim 2, wherein said discrimination vectors are orthogonal.

4. The method of claim 1, wherein an $i^{th}$ of said discrimination vectors, $V_i$, is selected to minimize a measure of interference caused by the $i^{th}$ information signal $s_i$.

5. The method of claim 4, wherein M×N channel matrices $H_1$ . . . $H_R$ model channels between said array of base station antennas and said remote transceivers $T_1$ . . . $T_R$, respectively, and wherein said measure of interference is:

$$\sum_{j \neq i} |H_j V_i|^2.$$

6. The method of claim 1, wherein an $i^{th}$ of said discrimination vectors, $V_i$, is selected to optimize a signal quality of the $i^{th}$ information signal $s_i$.

7. The method of claim 1, wherein said information signals share the same conventional channel.

8. The method of claim 1, further comprising the step of selecting an M-component signature vector $W_1$, and wherein $y_1 = W_1^* \cdot Z_1$.

9. The method of claim 8, wherein said signature vector $W_1$ is selected to maximize a signal quality parameter.

10. The method of claim 9, wherein an M×N channel matrix $H_1$ models a channel between said array of base station antennas and said first remote transceiver, and wherein said signal quality parameter is:

$$|W_1^* H_1 V_1|^2 \Big/ \sum_{i \neq 1} |W_1^* H_1 V_i|^2.$$

11. The method of claim 1, wherein said reconstructed signal $y_1$ depends nonlinearly upon said received signal vector $Z_1$.

12. The method of claim 1, further comprising the following steps for transmitting a remote information signal $s_1'$ from said first remote transceiver:
   (a) selecting an M-component remote processing vector $W_1'$;
   (b) computing an M-component remote transmission signal vector $U_1'$, wherein $U_1' = W_1' \cdot s_1'$; and (c) transmitting the M components of said remote transmission signal vector $U'_1$ from said M remote antennas of said first remote transceiver.

13. The method of claim 12, wherein said remote processing vector $W'_1$ is selected to maximize a remote transmission quality parameter.

14. The method of claim 13, wherein $\{e_1 \ldots e_N\}$ is a set of orthonormal N-component vectors; wherein an N×M channel matrix $H'_1$ models a channel between said first remote transceiver and said array of base station antennas; and wherein said remote transmission quality parameter is:

$$|e_1^* H'_1 W'_1|^2 \bigg/ \sum_{i \neq 1} |e_i^* H'_1 W'_1|^2.$$

15. The method of claim 1, further comprising the following steps:
   (a) receiving, through said array of base station antennas, an N-component base station received signal vector X;
   (b) selecting R base station signature vectors $V'_1 \ldots V'_R$, each of said base station signature vectors having N components; and
   (c) computing base station reconstructed signals $u_1 \ldots u_R$ corresponding to transmissions sent from said remote transceivers $T_1 \ldots T_R$, respectively, wherein $u_i = V'_i{}^* \cdot X$.

16. The method of claim 15, wherein an $i^{th}$ of said base station signature vectors, $V'_i$, is selected to maximize a base station reception quality parameter.

17. The method of claim 16, wherein R remote processing vectors $W'_1 \ldots W'_R$ characterize said transmissions sent from said remote transceivers $T_1 \ldots T_R$, respectively; wherein N×M channel matrices $H'_1 \ldots H'_R$ model channels between said remote transceivers $T_1 \ldots T_R$ and said array of base station antennas, respectively; and wherein said base station reception quality parameter is:

$$|V_i'^* H'_i W'_i|^2 \bigg/ \sum_{j \neq i} |V_i'^* H'_j W'_j|^2.$$

18. The method of claim 1, further comprising the following steps:
   (a) receiving, through said array of base station antennas, an N-component base station received signal vector X; and
   (b) computing base station reconstructed signals $u_1 \ldots u_R$ corresponding to transmissions sent from said remote transceivers $T_1 \ldots T_R$, respectively;
wherein said base station reconstructed signals $u_1 \ldots u_R$ depend nonlinearly upon said received signal vector X.

19. A method for using a remote transceiver to communicate with a base transceiver station, wherein said remote transceiver comprises M remote antennas, said method comprising the following steps:
   receiving, through said M remote antennas of said remote transceiver, an M-component received signal vector $Z_1$ wherein M>1;
   selecting an M-component signature vector $W_1$; and
   computing a reconstructed signal $y_1$ from said received signal vector $Z_1$ wherein $y_1 = W_1^* \cdot Z_1$.

20. The method of claim 19, wherein said signature vector $W_1$ is selected to maximize a signal quality parameter.

21. The method of claim 20, wherein R discrimination vectors $V_1 \ldots V_R$ characterize transmissions from said base transceiver station, each of said discrimination vectors having N components; wherein an M×N channel matrix $H_1$ models a channel between said base transceiver station and said remote transceiver; and wherein said signal quality parameter is:

$$|W_1^* H_1 V_1|^2 \bigg/ \sum_{i \neq 1} |W_1^* H_1 V_i|^2.$$

22. A method for transmitting a remote information signal $s_1'$ from a remote transceiver to a base transceiver station, wherein said remote transceiver comprises M remote antennas, wherein M>1, said method comprising the following steps:
   (a) selecting an M-component remote processing vector $W'_1$;
   (b) computing an M-component remote transmission signal vector $U'_1$, wherein $U'_1 = W'_1 s'_1$; and
   (c) transmitting the M components of said remote transmission signal vector $U'_1$ from said remote antennas of said remote transceiver.

23. The method of claim 22, wherein said remote processing vector $W'_1$ is selected to maximize a remote transmission quality parameter.

24. The method of claim 23, wherein $\{e_1 \ldots e_N\}$ is a set of orthonormal N-component vectors; wherein an N×M channel matrix $H'_1$ models a channel between said remote transceiver and said base transceiver station; and wherein said remote transmission quality parameter is:

$$|e_1^* H'_1 W'_1|^2 \bigg/ \sum_{i \neq 1} |e_i^* H'_1 W'_1|^2.$$

25. In a wireless communication system comprising a base transceiver station having an array of base station antennas, a method for simultaneously sending R information signals $s_1 \ldots s_R$ to R remote transceivers $T_1 \ldots T_R$, respectively, wherein each of said remote transceivers comprises M remote antennas; said method comprising the following steps:
   (a) selecting R discrimination vectors $V_1 \ldots V_R$, each of said discrimination vectors having N components;
   (b) computing an N-component transmission signal vector U, wherein $$U = \sum_{i=1}^{R} V_i s_i;$$

(c) transmitting the N components of said transmission signal vector U from said array of base station antennas;
wherein $N \geq R$ and M>1.

26. The method of claim 25, wherein said discrimination vectors are linearly independent.

27. The method of claim 26, wherein said discrimination vectors are orthogonal.

28. The method of claim 25, wherein an $i^{th}$ of said discrimination vectors, $V_i$, is selected to minimize a measure of interference caused by the $i^{th}$ information signal $s_i$.

29. The method of claim 28, wherein M×N channel matrices $H_1 \ldots H_R$ model channels between said array of base station antennas and said remote transceivers $T_1 \ldots T_R$, respectively, and wherein said measure of interference is:

$$\sum_{j \neq i} |H_j V_i|^2.$$

30. The method of claim 25, wherein an $i^{th}$ of said discrimination vectors, $V_i$, is selected to optimize a signal quality of the $i^{th}$ information signal $s_i$.

31. The method of claim 25, wherein said information signals share the same conventional channel.

32. The method of claim 25, further comprising the following steps:
   (a) receiving, through said array of base station antennas, an N-component base station received signal vector X;
   (b) selecting R base station signature vectors $V'_1 \ldots V'_R$, each of said base station signature vectors having N components; and
   (c) computing base station reconstructed signals $u_1 \ldots u_R$ corresponding to transmissions sent from said remote transceivers $T_1 \ldots T_R$, respectively, wherein $u_i = V'_i{}^* \cdot X$.

33. The method of claim 32, wherein an $i^{th}$ of said base station signature vectors, $V'_i$, is selected to maximize a base station reception quality parameter.

34. The method of claim 33, wherein R remote processing vectors $W'_1 \ldots W'_R$ characterize said transmissions sent from said remote transceivers $T_1 \ldots T_R$, respectively; wherein N×M channel matrices $H'_1 \ldots H'_R$ model channels between said remote transceivers $T_1 \ldots T_R$ and said array of base station antennas, respectively; and wherein said base station reception quality parameter is:

$$|V_i'{}^* H_i' W_i'|^2 / \sum_{j \neq i} |V_i'{}^* H_j' W_j'|^2.$$

35. The method of claim 25, further comprising the following steps:
   (a) receiving, through said array of base station antennas, an N-component base station received signal vector X; and
   (b) computing base station reconstructed signals $u_1 \ldots u_R$ corresponding to transmissions sent from said remote transceivers $T_1 \ldots T_R$, respectively;
   wherein said reconstructed signals $u_1 \ldots u_R$ depend nonlinearly upon said received signal vector X.

36. A remote transceiver for use in a wireless communication system, wherein said wireless system comprises a base transceiver station, said remote transceiver comprising:
   M remote antennas, wherein M>1;
   receiving processing means electrically connected to said remote antennas, for computing a reconstructed signal $y_1$ from an M-component received signal vector $Z_1$ received by said M remote antennas, wherein said receive processing means computes said reconstructed signal $y_1$ using an M-component signature vector $W_1$ according to the formula: $y_1 = W_1{}^* \cdot Z_1$.

37. The remote transceiver of claim 36, wherein said receive processing means selects said signature vector $W_1$ to maximize a signal quality parameter.

38. The remote transceiver of claim 37, wherein R discrimination vectors $V_1 \ldots V_R$ characterize transmissions from said base transceiver station, each of said discrimination vectors having N components; wherein an M×N channel matrix $H_1$ models a channel between said base transceiver station and said remote transceiver; and wherein said signal quality parameter is:

$$|W_1^* H_1 V_1|^2 / \sum_{i \neq 1} |W_1^* H_1 V_i|^2.$$

39. A remote transceiver for use in a wireless communication system, wherein said wireless communication system comprises a base transceiver station, said remote transceiver comprising:
   M remote antennas, wherein M>1;
   transmit processing means for preparing a remote information signal $s_1'$ for transmission by the following steps:
      (a) selecting an M-component remote processing vector $W'_1$; and
      (b) computing an M-component remote transmission signal vector $U'_1$ for transmission from said remote antennas of said remote transceiver, wherein $U'_1 = W'_1 \cdot s'_1$.

40. The remote transceiver of claim 39, wherein said transmit processing means selects said remote processing vector $W'_1$ to maximize a remote transmission quality parameter.

41. The remote transceiver of claim 40, wherein $\{e_1 \ldots e_N\}$ is a set of orthonormal N-component vectors; wherein an N×M channel matrix $H'_1$ models a channel between said remote transceiver and said base transceiver station; and wherein said remote transmission quality parameter is:

$$|e_1^* H_1' W_1'|^2 / \sum_{i \neq 1} |e_i^* H_1' W_1'|^2.$$

42. A base transceiver station for simultaneously sending R information signals $s_1 \ldots s_R$ to R remote transceivers $T_1 \ldots T_R$, respectively, wherein each of said remote transceivers comprises M remote antennas; said base transceiver station comprising:
   (a) a number N of base station antennas;
   (b) transmit processing means electrically connected to said base station antennas, for (i) selecting R discrimination vectors $V_1 \ldots V_R$, each of said discrimination vectors having N components; and (ii) computing an N-component transmission signal vector U for transmission from said base station antennas; wherein $$U = \sum_{i=1}^{R} V_i s_i;$$

wherein $N \geq R$ and M>1.

43. The base transceiver station of claim 42, wherein said discrimination vectors are linearly independent.

44. The base transceiver station of claim 43, wherein said discrimination vectors are orthogonal.

45. The base transceiver station of claim 42, wherein said transmit processing means selects an $i^{th}$ of said discrimination vectors, $V_i$, to minimize a measure of interference caused by the $i^{th}$ information signal $s_i$.

46. The base transceiver station of claim 45, wherein M×N channel matrices $H_1 \ldots H_R$ model channels between said base station antennas and said remote transceivers $T_1 \ldots T_R$, respectively, and wherein said measure of interference is:

$$\sum_{j \ne i} |H_j V_i|^2.$$

47. The base transceiver station of claim 42, wherein said transmit processing means selects an $i^{th}$ of said discrimination vectors, $V_i$, to optimize a signal quality of the $i^{th}$ information signal $s_i$.

48. The base transceiver station of claim 42, wherein said information signals share the same conventional channel.

49. The base transceiver station of claim 42, further comprising receive processing means for processing an N-component base station received signal vector X received by said N base station antennas; wherein said receive processing means
   (a) selects R base station signature vectors $V_1' \ldots V_R'$, each of said base station signature vectors having N components; and
   (b) computes base station reconstructed signals $u_1 \ldots u_R$ corresponding to transmissions from said remote transceivers $T_1 \ldots T_R$, respectively, wherein $u_i = V_i^* \cdot X$.

50. The base transceiver station of claim 49, wherein said receive processing means selects an $i^{th}$ of said base station signature vectors, $V_i'$, to maximize a base station reception quality parameter.

51. The base transceiver station of claim 50, wherein R remote processing vectors $W'_1 \ldots W'_R$ characterize said transmissions sent from said remote transceivers $T_1 \ldots T_R$, respectively; wherein N×M channel matrices $H'_1 \ldots H'_R$ model channels between said remote transceivers $T_1 \ldots T_R$ and said base station antennas, respectively; and wherein said base station reception quality parameter is:

$$|V_i'^* H_i' W_i'|^2 \Big/ \sum_{j \ne i} |V_i'^* H_j' W_j'|^2.$$

52. The base transceiver station of claim 42, further comprising receive processing means for processing an N-component base station received signal vector X received by said N base station antennas; wherein said receive processing means computes base station reconstructed signals $u_1 \ldots u_R$ corresponding to transmissions from said remote transceivers $T_1 \ldots T_R$, respectively, wherein said base station reconstructed signals $u_1 \ldots u_R$ depend nonlinearly upon said base station received signal vector X.

53. In a wireless communication system comprising a base transceiver station having an array of N base station antennas, a method for simultaneously sending R information vectors $S_1 \ldots S_R$ to R remote transceivers $T_1 \ldots T_R$, respectively, wherein each of said information vectors comprises p components, and each of said remote transceivers comprises M remote antennas; said method comprising the following steps:
   (a) selecting R discrimination matrices $V_1 \ldots V_R$, wherein each of said discrimination matrices is an N×p matrix;
   (b) computing an N-component transmission signal vector U, wherein $$U = \sum_{i=1}^{R} V_i S_i; \text{ and}$$

(c) transmitting the N components of said transmission signal vector U from said array of N base station antennas;
wherein $N \ge R$ and $M > 1$.

54. The method of claim 53, wherein p is a function of the time of flight difference between two paths in a channel from said base transceiver station to one of said remote transceivers.

55. The method of claim 53, wherein p is equal to a number of sub-carrier frequencies transmitted simultaneously by said base transceiver station.

56. A method of using a remote transceiver to communicate with a base transceiver station, wherein said remote transceiver comprises M remote antennas; said method comprising the following steps:
   (a) receiving, through said M remote antennas of said remote transceiver, p' consecutive M-component received signal vectors $Z11 \ldots Z1p'$; and
   (b) computing a reconstructed signal vector Y1 from p' signature vectors $W11 \ldots W1p'$ and the p' consecutive received signal vectors $Z11 \ldots Z1p'$; wherein $M > 1$, $$Y_1 = \sum_{i=1}^{p'} W_{1i}^* \cdot Z_{1i},$$

and wherein p' is a function of the time of flight difference between two paths in a channel from said base transceiver station to said remote transceiver.

57. A base transceiver station for simultaneously sending R information vectors $S_1 \ldots S_R$ to R remote transceivers $T_1 \ldots T_R$, respectively, wherein each of said information vectors comprises p components, and each of said remote transceivers comprises M remote antennas; said base transceiver station comprising:
   (a) a number N of base station antennas; and
   (b) transmit processing means electrically connected to said base station antennas, for (i) selecting R discrimination matrices $V_1 \ldots V_R$, wherein each of said discrimination matrices is an N×p matrix; and (ii) computing an N-component transmission signal vector U for transmission from said base station antennas; wherein $$U = \sum_{i=1}^{R} V_i S_i;$$

wherein $N \ge R$ and $M > 1$.

58. The base transceiver station of claim 57, wherein p is selected to implement frequency filtering.

59. A remote transceiver for use in a wireless communication system, wherein said wireless communication system comprises a base transceiver station; said remote transceiver comprising:
   (a) M remote antennas, wherein $M > 1$; and
   (b) receiving processing means electrically connected to said remote antennas, for computing a reconstructed signal $Y_1$ from p' signature vectors $W_{11} \ldots W_{1p'}$ and p' consecutive M-component received signal vectors $Z_{11} \ldots Z_{1p'}$ received by said M remote antennas, wherein $$Y_1 = \sum_{i=1}^{p'} W_{1i}^* \cdot Z_{1i},$$

and wherein p' is selected to implement time filtering.

* * * * *